US006471890B2

United States Patent
Tanigawa et al.

(10) Patent No.: US 6,471,890 B2
(45) Date of Patent: Oct. 29, 2002

(54) METHOD FOR PRODUCING A POSITIVE ELECTRODE ACTIVE MATERIAL FOR AN ALKALINE STORAGE BATTERY

(75) Inventors: Futoshi Tanigawa, Fujisawa (JP); Yasushi Nakamura, Kamakura (JP); Yoshitaka Dansui, Fujisawa (JP); Kohji Yuasa, Chigasaki (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 28 days.

(21) Appl. No.: 09/828,740

(22) Filed: Apr. 9, 2001

(65) Prior Publication Data

US 2002/0024041 A1 Feb. 28, 2002

(30) Foreign Application Priority Data

Jul. 14, 2000 (JP) .................................. 2000-215087
Jul. 24, 2000 (JP) .................................. 2000-221772
Sep. 29, 2000 (JP) .................................. 2000-298086

(51) Int. Cl.[7] .......................... H01B 1/02; H01M 4/58; H01M 4/52; H01M 4/32; C01G 51/04; C01G 53/04
(52) U.S. Cl. ....................... 252/521.2; 252/518.1; 252/519.51; 423/583; 423/594; 423/599; 423/600; 429/209; 429/218.1; 429/222; 429/223; 429/224; 429/231.6
(58) Field of Search ................ 423/583, 594, 423/599, 600; 252/518.1, 519.51, 521.2; 429/209, 218.1, 222, 223, 224, 231.6

(56) References Cited

U.S. PATENT DOCUMENTS 5,523,182 A * 6/1996 Ovshinsky et al. ......... 429/223
6,007,946 A * 12/1999 Yano et al. .................. 429/206

FOREIGN PATENT DOCUMENTS

| JP | 60-254564 A | 12/1985 | |
| JP | 61-74261 A | 4/1986 | |
| JP | 4-26058 A | 1/1992 | |
| JP | 04026058 * | 1/1992 | ............ H01M/4/32 |
| JP | 8-148145 A | 6/1996 | |
| JP | 10-74512 A | 3/1998 | |
| JP | 10074512 * | 3/1998 | ............ H01M/4/52 |
| JP | 11-219701 A | 8/1999 | |
| JP | 11-329425 A | 11/1999 | |

OTHER PUBLICATIONS

Pralog et al, "The outcome of Cobalt in Nickel–Cobalt Oxyhydroxide3 Electrodes of Alkaline Batteries", J. Solid State Chem. 162, 270–281 (2001).*

Lichtenberg et al, "Stability enhancement of the CoOOH conductive network of nickel hydroxide electrodes", J. Power Sources. 62, 207–211 (1966).*

* cited by examiner

Primary Examiner—Mark Kopec
Assistant Examiner—Kallambella Vijayakumar
(74) Attorney, Agent, or Firm—Akin, Gump, Strauss, Hauer & Feld, L.L.P.

(57) ABSTRACT

The method for producing a positive electrode active material for an alkaline storage battery is disclosed. The method includes a first oxidation treatment of a raw material powder comprising a nickel hydroxide solid solution and cobalt hydroxide to oxidize the cobalt hydroxide to a cobalt oxyhydroxide; and a second oxidation treatment of the powder obtained in the first oxidation treatment to oxidize the nickel hydroxide solid solution to a nickel oxyhydroxide solid solution.

11 Claims, 4 Drawing Sheets

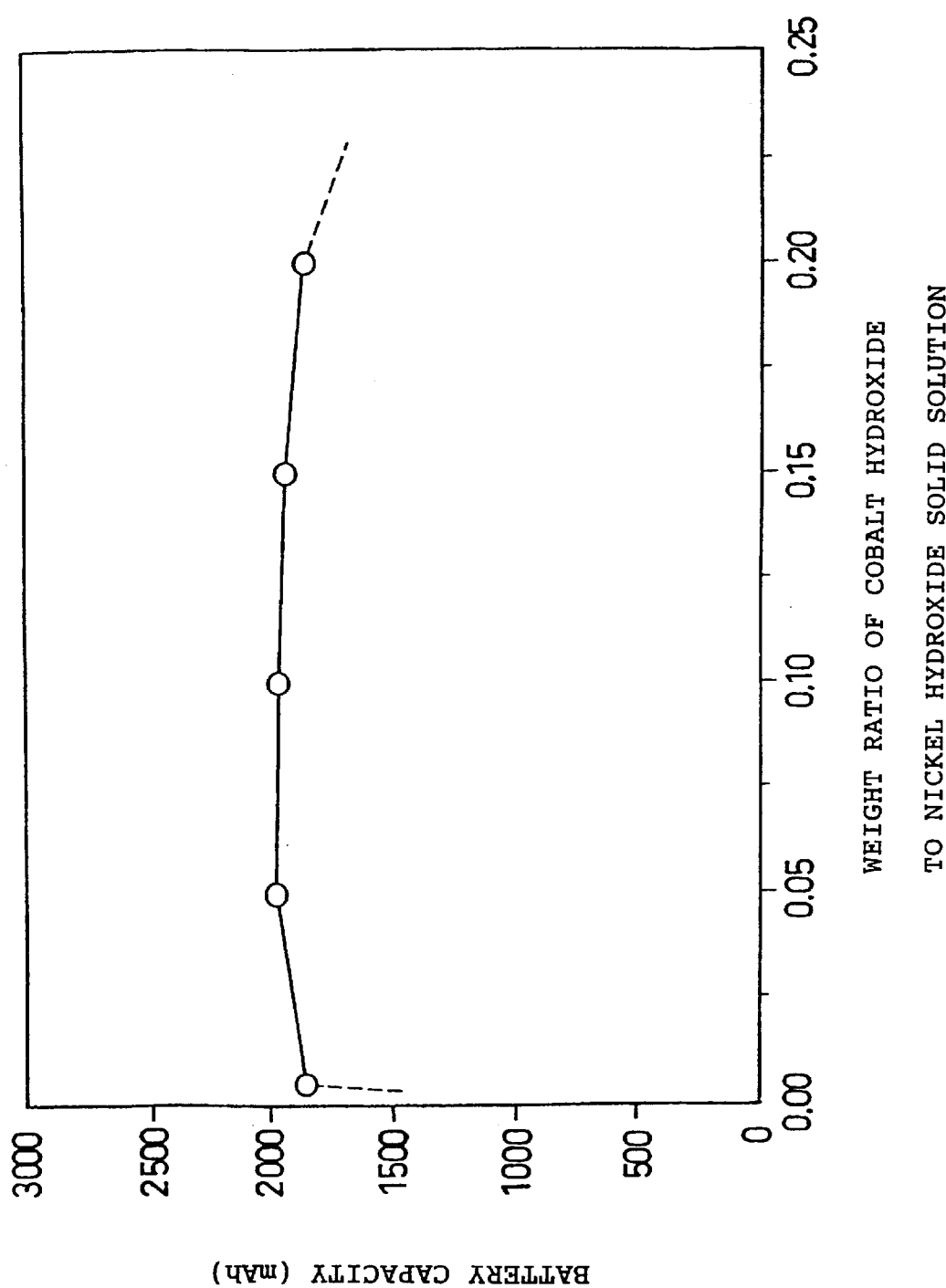
F I G. 1

METHOD FOR PRODUCING A POSITIVE ELECTRODE ACTIVE MATERIAL FOR AN ALKALINE STORAGE BATTERY

BACKGROUND OF THE INVENTION

The present invention relates to a method for producing a positive electrode active material for an alkaline storage battery.

Secondary batteries are mounted on most of portable apparatuses, such as cellular phones and laptop computers. Under such circumstances, development of a secondary battery having a higher capacity has been strongly desired. The positive electrode has been improved as discussed below to attain the higher capacity of alkaline storage batteries.

Both a sintered positive electrode and a paste type positive electrode are applicable for the alkaline storage battery. The sintered positive electrode has a substrate having pores of approximately 10 μm in diameter. The substrate is obtained by sintering a nickel powder and a core material such as a perforated metal sheet, and has a small porosity of approximately 80%. This substrate is accordingly filled with a relatively small quantity of the active material. The paste type positive electrode, on the other hand, has a foamed nickel substrate having pores of approximately 500 μm, where the pores are communicating each other and arranged in a three-dimensional manner. The foamed nickel substrate has a large porosity of approximately 95%. This substrate is accordingly filled with a relatively large quantity of the active material. Namely the paste type positive electrode has a higher capacity.

The electrical conductivity of nickel hydroxide, which is the active material of the paste type positive electrode, varies with a variation in oxidation number of nickel: that is, high conductivity for the large oxidation number and low conductivity for the small oxidation number. The oxidation of nickel hydroxide in charging process of a battery thus proceeds smoothly, but the reduction in discharging process does not proceed smoothly, due to the lowered electrical conductivity in the terminal stage of the discharging process. This causes an insufficient discharge. A conductive agent, such as a cobalt compound, is added to the active material, with a view to enhancing the electrical conductivity in the positive electrode and ensuring the sufficient discharge.

In the case cobalt hydroxide is added to the active material, the first charging after the manufacture of the battery causes a cobalt oxyhydroxide having a good conductivity to deposit on the surface of the nickel hydroxide as the active material. This ensures the favorable conductive networks as is explained in Japanese Laid-Open Patent Application Sho 61-74261. A cobalt oxyhydroxide is stable within a standard voltage range of the battery and keeps the conductive networks.

In the alkaline storage batteries, the negative electrode generally has a greater capacity than the capacity of the positive electrode. The residual non-charged capacity of the negative electrode under the full charged condition of the positive electrode is referred to as the charge reservoir, and the residual charged capacity of the negative electrode under the full discharged condition of the positive electrode is referred to as the discharge reservoir.

When the battery is excessively charged, the reaction as defined below occurs at the positive electrode to produce oxygen:

$$OH^{31} \rightarrow 1/2H_2O + 1/4O_2 + e^-$$

Oxygen reacts with the hydrogen absorbed in the negative electrode and is consumed like below:

$$MH \text{ (metal hydride)} + 1/4O_2 \rightarrow M \text{ (alloy)} + 1/2H_2O$$

$$M + H_2O + e^- \rightarrow MH + OH^-$$

The hydrogen storage alloy of the negative electrode hardly absorbs hydrogen in the terminal stage of a charging process of a battery. The presence of the alloy that has not yet absorbed hydrogen as the charge reservoir effectively depresses the generation of gaseous hydrogen, which enables the battery to be sealed.

The following describes the discharge reservoir in the paste type positive electrode including nickel, which is obtained by adding cobalt hydroxide as a conductive agent to nickel hydroxide functioning as the active material. The initial charging of the battery having this positive electrode changes cobalt hydroxide to a cobalt oxyhydroxide. The electrical quantity stored in the negative electrode during this process becomes a part of the discharge reservoir. The capacity of nickel hydroxide is 289 mAh/g, and the capacity of cobalt hydroxide is 288 mAh/g. In the case cobalt hydroxide is used at a rate of 10% by weight of nickel hydroxide, the discharge reservoir obtained is about one tenth of the capacity of the positive electrode.

The oxidation number of nickel in nickel hydroxide is initially 2 but rises to approximately 3.2 by charging of the battery, so that nickel hydroxide is changed to a nickel oxyhydroxide. The discharging of the battery is concluded when the oxidation number of nickel decreases to approximately 2.2. The non-discharged nickel oxyhydroxide thus remains to give the discharge reservoir of about two tenths of the capacity of the positive electrode. The nickel-metal hydride storage battery accordingly has the total discharge reservoir of about three tenths of the capacity of the positive electrode.

The adequate quantity of the discharge reservoir is at most about one tenth of the capacity of the positive electrode. Namely the capacity corresponding to about two tenths of the capacity of the positive electrode are excessive in the negative electrode. In other words, the prior art battery includes a specific quantity of the hydrogen storage alloy that does not contribute to charging and discharging. Regulating the quantity of the discharge reservoir to the appropriate level desirably reduces the required quantity of the expensive hydrogen storage alloy and gives a battery of high energy density at a low manufacturing cost.

From these viewpoints, the positive electrode of the battery disclosed in Japanese Laid-Open Patent Application Sho 60-254564 includes nickel hydroxide, cobalt, and a nickel oxyhydroxide required for oxidation of cobalt. This proposed battery has the reduced discharge reservoir due to the oxidation of cobalt. The positive electrodes of the batteries disclosed in Japanese Laid-Open Patent Applications Hei 4-26058 and Hei 8-148145 include a particulate nickel hydroxide with a cobalt oxyhydroxide carried thereon.

The battery disclosed in Japanese Laid-Open Patent Application Hei 11-219701 seems to attain the greatest effect of reducing the discharge reservoir, among the various prior art batteries. The positive electrode of this proposed battery includes a first active material, which comprises a particulate nickel hydroxide with a cobalt oxyhydroxide carried thereon, and a second active material, which comprises a particulate nickel oxyhydroxide with a cobalt oxyhydroxide carried thereon. The weight ratio of the first active material to the second active material ranges from 90/10 to 60/40. Some methods for obtaining such a particulate nickel hydroxide with a cobalt oxyhydroxide carried thereon have been disclosed in Japanese Laid Open Patent Hei 10-74512 and Hei 11-329425.

In the positive electrode of the battery disclosed in Japanese Laid Open Patent Hei 11-219701, however, the oxidation number of nickel in the nickel oxyhydroxide of the second active material is not specified. The quantity of the discharge reservoir in the negative electrode depends upon not only the weight ratio of the first active material to the second active material but the oxidation number of nickel in the nickel oxyhydroxide of the second active material. Namely the adequate quantity of the discharge reservoir is unknown in the battery disclosed in Japanese Laid Open Patent Hei 11-219701. Further, there are disclosed no method for producing a positive electrode active material, which is capable of oxidizing the cobalt hydroxide portion and nickel hydroxide portion of the raw material to a desired oxidation state.

Conventionally, particulate nickel hydroxide with a cobalt oxyhydroxide carried thereon is prepared by dispersing a nickel powder having cobalt hydroxide carried thereon in an aqueous alkaline solution. If, however, the alkali concentration of the aqueous alkaline solution is high, cobalt hydroxide of the raw material is undesirably dissolved in the aqueous alkaline solution or precipitated again. In addition, a rapid structure change occurs in the cobalt hydroxide portion of the raw material and causes the raw material to partially liberate any cobalt compounds. These cobalt compounds thus liberated are very fine and hence adhere to the inner wall of the reaction bath. Accordingly, the quantity of cobalt in the active material varies. If the alkali concentration of the aqueous alkaline solution is low, on the other hand, oxidation of the cobalt hydroxide portion does not proceed until the oxidation number of cobalt exceeds 3 particularly when the temperature is low. This results in a production of a cobalt oxyhydroxide of a low oxidation state, which exhibits low electrical conductivity. Use of such an active material causes the capacity of the battery to lower.

BRIEF SUMMARY OF THE INVENTION

The present invention is directed to a method for producing a positive electrode active material for an alkaline storage battery, comprising a first oxidation treatment of a raw material powder, which comprises a nickel hydroxide solid solution, that is, a hydroxide comprising a plurality of metals including Ni as a major component, and cobalt hydroxide, to oxidize the cobalt hydroxide to a cobalt oxyhydroxide; and a second oxidation treatment of a powder having passed through the first oxidation treatment to oxidize the nickel hydroxide solid solution to a nickel oxyhydroxide solid solution, that is, an oxyhydroxide comprising a plurality of metals including Ni as a major component.

The present invention is also directed to a method wherein the raw material powder is a nickel hydroxide solid solution powder having cobalt hydroxide carried thereon, or a mixture comprising a nickel hydroxide solid solution powder and a cobalt hydroxide powder.

The present invention is also directed to a method wherein the first oxidation treatment is a process where the raw material powder with an aqueous alkaline solution is heated and dried in an atmosphere having oxygen while being stirred, and the second oxidation treatment is a process where the powder having passed through the first oxidation treatment is dispersed in water or an aqueous alkaline solution and mixed with an oxidizing agent.

It is preferable that, in the first oxidation treatment, the aqueous alkaline solution has a normality of 1N or more and contains at least one selected from the group consisting of sodium hydroxide and potassium hydroxide, and in the second oxidation treatment, the aqueous alkaline solution contains at least one selected from the group consisting of sodium hydroxide, potassium hydroxide, and lithium hydroxide.

It is also preferable that, in the first oxidation treatment, the cobalt hydroxide is oxidized until an oxidation number of cobalt thereof becomes more than 3, and in the second oxidation treatment, the nickel hydroxide solid solution is oxidized until an oxidation number of nickel thereof becomes not less than 2.1 and less than 2.2. In this case, the resultant product can be used as an active material that is capable of making the quantity of the discharge reservoir adequate even when used alone.

The present invention is also directed to a method wherein the raw material powder is a nickel hydroxide solid solution powder having β-cobalt hydroxide carried thereon, the first oxidation treatment is a process where the raw material powder is heated to 80 to 160° C. with heated air, or a process where the raw material powder is dispersed in water or an aqueous alkaline solution and mixed with an oxidizing agent, to give a nickel hydroxide solid solution powder having cobalt oxyhydroxide of a low oxidation state carried thereon, and the second oxidation treatment is a process where the powder having passed through the first oxidation treatment is dispersed in an aqueous alkaline solution of 30 to 80° C. having a normality of 1N or more and mixed with an oxidizing agent to give a nickel oxyhydroxide solid solution powder having a cobalt oxyhydroxide of a high oxidation state carried thereon.

In this method, it is preferable that an oxidation number of cobalt in the cobalt oxyhydroxide of a low oxidation state is more than 2 and not more than 3, and an oxidation number of cobalt in the cobalt oxyhydroxide of a high oxidation state is more than 3.

The electrical conductivity in the compressed form of the cobalt oxyhydroxide of a low oxidation state is, for example, approximately $10^{-7}$ to $10^{-5}$ S/cm. The electrical conductivity in the compressed form of the cobalt oxyhydroxide of a high oxidation state is preferably higher than that of the former, for example, approximately $10^{-2}$ to 1.0 S/cm.

It is also preferable that, in the second oxidation treatment, the aqueous alkaline solution contains at least one selected from the group consisting of sodium hydroxide, potassium hydroxide, and lithium hydroxide.

The present invention is further directed to a method for producing a positive electrode active material for an alkaline storage battery, comprising a process where a nickel hydroxide solid solution powder having a-cobalt hydroxide carried thereon is dispersed in an aqueous alkaline solution of 25 to 80° C. having a pH value of not more than 10 and mixed with an oxidizing agent to give a positive electrode active material comprising a nickel oxyhydroxide solid solution powder having a cobalt oxyhydroxide carried thereon.

It is preferable that the nickel hydroxide solid solution contains at least one element selected from the group consisting of Co, Zn, Cd, Ca, Sr, Mg, Mn, and Al.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a graph showing the relation between the weight ratio of cobalt hydroxide to a nickel hydroxide solid solution in the raw material powder and the capacity of a battery using a resultant active material.

DETAILED DESCRIPTION OF THE INVENTION

Embodiment 1

(i) Raw Material Powder

Figure 2:
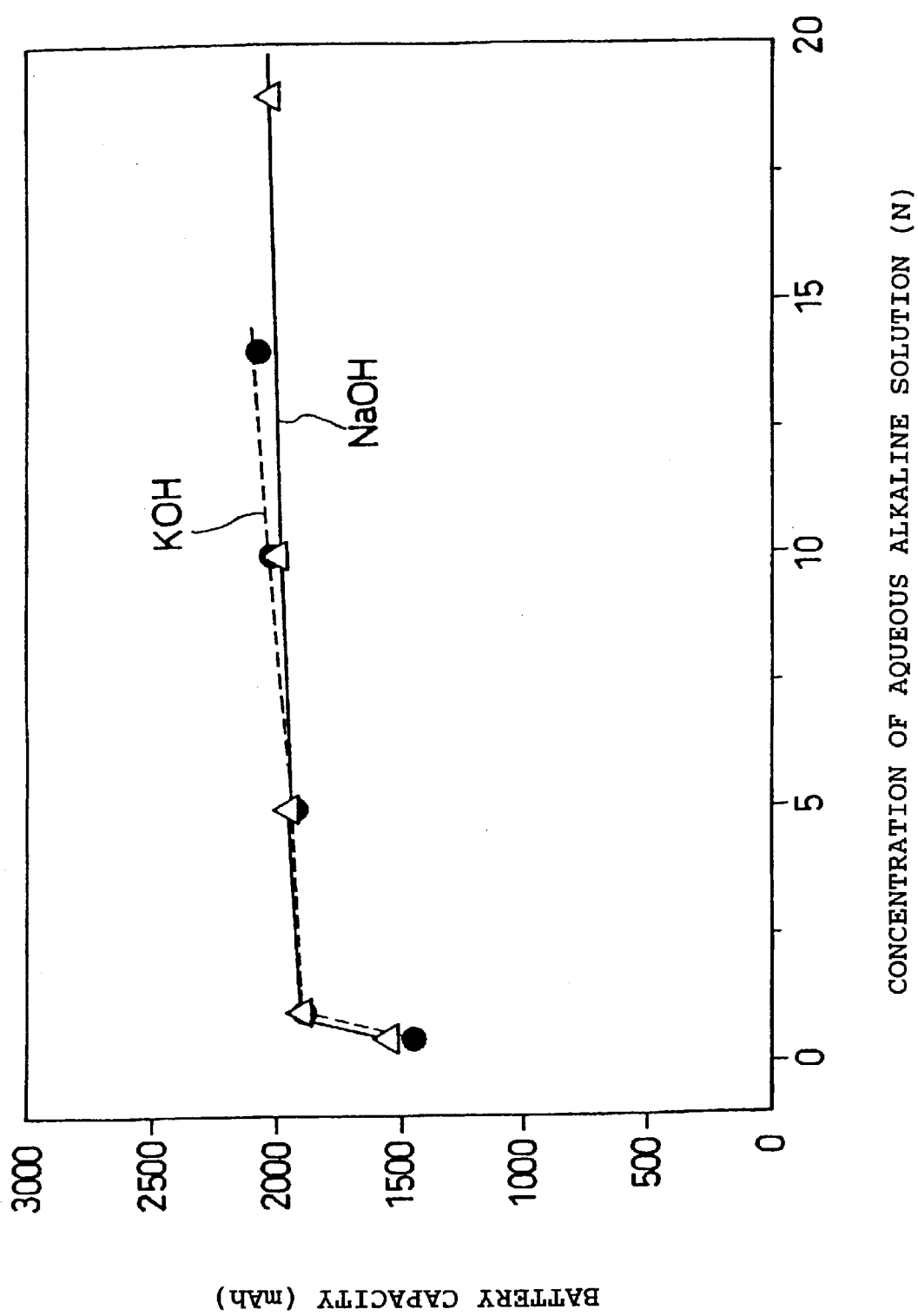
FIG. 2 is a graph showing the relation between the alkali concentration of an aqueous alkaline solution used in the first oxidation treatment of embodiment 1 of the present invention and the capacity of a battery using a resultant active material.

In this embodiment, description is made of a case using a nickel hydroxide solid solution powder having cobalt hydroxide carried thereon as a raw material powder.

The raw material powder is commercially available. This powder usually has a mean particle size of 5 to 20 $\mu$m. The powder can be obtained, for example, in the following manner. First, a nickel hydroxide solid solution powder is dispersed in an aqueous alkaline solution. Subsequently, an aqueous cobalt sulfate solution together with an aqueous ammonia solution or aqueous ammonium sulfate solution is added to the obtained dispersion containing the powder, while an additional aqueous alkaline solution is added dropwise to make the pH value constant. This process is referred to as "precipitation process by neutralization".

To obtain a positive electrode active material that does not change in volume easily, it is preferable that the nickel hydroxide solid solution powder contains at least one element selected from the group consisting of Co, Zn, Cd, Ca, Sr, Mg, Mn and Al. This can be also said in the following embodiments.

The quantity of cobalt hydroxide in the raw material powder is preferably 0.5 to 20 parts by weight per 100 parts by weight of the nickel hydroxide solid solution. If the quantity of cobalt hydroxide is less than 0.5 parts by weight, the surface of particle of the nickel hydroxide solid solution is not sufficiently covered thereby. As a result, insufficient conductive networks are formed in the positive electrode. If, on the other hand, the quantity of cobalt hydroxide is more than 20 parts by weight, the quantity of nickel hydroxide in the positive electrode becomes insufficient, thus resulting in the positive electrode having a lowered energy density.

(ii) First Oxidation Treatment

In the first oxidation treatment, initially an aqueous alkaline solution is added to the raw material powder. The quantity of the aqueous alkaline solution is dependent upon the concentration thereof. Generally, 5 to 15 ml of the solution per 100 g of the raw material powder is suitable. Preferably, the aqueous alkaline solution has a normality of 1N or more and contains at least one selected from the group consisting of sodium hydroxide and potassium hydroxide. Use of such a high-concentration aqueous alkaline solution causes the electric potential, at which cobalt is oxidized, to lower and, hence, cobalt is likely to be oxidized to a high oxidation degree.

Subsequently, the raw material powder with the alkaline solution is heated in an oxygen atmosphere while being stirred. Heating also causes the electric potential at which cobalt is oxidized to lower. The alkaline solution may be added to the raw material powder dropwise while the powder is heated and stirred in an oxygen atmosphere. The oxidation reaction of cobalt hydroxide produces water. For this reason, the powder is dried at the same time with heating to secure a sufficient contact area between oxygen and the powder. If the contact area between oxygen and the powder is too small, $Co_3O_4$, which is of a low oxidation state and poor electrical conductivity, is likely to result.

Such heating and drying may be performed using heated air, heated wall, microwave or the like. To achieve adequate drying of the powder, it is preferable that at least heated air is delivered. The temperature of the heating and drying is preferably 60 to 130° C. If the heating temperature is too high, the resultant active material becomes electrochemically inactive. The time period of the heating and drying is suitably 10 to 60 minutes.

This step enables oxidation of cobalt hydroxide to the degree that the oxidation number of cobalt exceed 3 with the nickel hydroxide solid solution hardly oxidized by controlling the quantity of the aqueous alkaline solution, the heating and drying temperature, the time period of the heating and drying, and like factors.

(iii) Second Oxidation Treatment

In the second oxidation treatment, initially the powder obtained in the first oxidation treatment is dispersed in water or an aqueous alkaline solution. By dispersing the powder in water or the aqueous alkaline solution, it is possible to obtain an uniformly oxidized nickel oxyhydroxide. The aqueous alkaline solution allows a smoother oxidation reaction to proceed than water.

The aforementioned aqueous alkaline solution preferably contains at least one selected from the group consisting of sodium hydroxide, potassium hydroxide and lithium hydroxide. Particularly when the aqueous alkaline solution containing lithium hydroxide is used, lithium ions penetrate into the particle of the powder or are adsorbed by the surface of the powder, thereby to produce an active material with higher utilization. The normality of the aqueous alkaline solution is preferably 1N or more.

Subsequently, the dispersion is mixed with an oxidizing agent to oxidize mainly the nickel hydroxide solid solution portion of the powder. Though the oxidation reaction proceeds at an ordinary temperature, a temperature of 30 to 80° C. allows the oxidation reaction to proceed more smoothly.

Examples of suitable oxidizing agents include NaClO KClO, $Na_2S_2O_8$, $K_2S_2O_8$, $(NH_4)_2S_2O_8$, and $H_2O_2$. These oxidizing agents may be used either alone or as a combination of two or more of them.

The quantity of the oxidizing agent to be used is suitably 30 to 65 ml per 100 g of the raw material powder when, for example, the nickel oxyhydroxide of which an oxidation number of nickel is not less than 2.1 and less than 2.2 is to be obtained using an aqueous solution of NaClO having an effective chlorine quantity of 12% by weight. Such an active material of which an oxidation number of nickel is not less than 2.1 and less than 2.2, even when used alone, is capable of adjusting the quantity of discharge reservoir of the battery to an adequate quantity with accuracy.

When the nickel oxyhydroxide of which an oxidation number of nickel is more than 2.2 is desired, the quantity of the aforementioned aqueous solution of NaClO to be used is suitably 65 to 400 ml per 100 g of the raw material powder. Such an active material of which an oxidation number of nickel is more than 2.2, if combined with a nickel hydroxide solid solution powder having a cobalt oxyhydroxide carried thereon, is capable of adjusting the quantity of discharge reservoir of the battery to an adequate quantity with accuracy.

With the prior art methods, it has been difficult to control the oxidation number of cobalt or nickel. With the method of the present invention, in contrast, it is possible to select suitable oxidation conditions in each of the first and second oxidation treatment, hence, to control the oxidation number of cobalt or nickel as desired.

Embodiment 2
(i) Raw Material Powder

In this embodiment, description is made of a case using a mixture comprising a nickel hydroxide solid solution powder and a cobalt hydroxide powder as a raw material powder. The both powders are commercially available. The nickel hydroxide solid solution powder usually has a mean particle size of 5 to 20 $\mu$m, and the cobalt hydroxide powder usually has a mean particle size of 0.2 to 3 $\mu$m. The quantity of the cobalt hydroxide powder in the mixture is suitably 0.5 to 20 parts by weight per 100 parts by weight of the nickel hydroxide solid solution powder. This embodiment is the same as embodiment 1 except that the raw material powder is different from that used in embodiment 1.

(ii) First Oxidation Treatment

In the first oxidation treatment of this embodiment, cobalt hydroxide is provided on the surface of the particle of the nickel hydroxide solid solution and adhered thereto, and then the cobalt hydroxide is oxidized into a cobalt oxyhydroxide. In this process using the powder mixture as a raw material powder, it is possible to cause a cobalt oxyhydroxide to adhere to the surface of the particle of the nickel hydroxide solid solution powder in a highly dispersed state.

(iii) Second Oxidation Treatment

The second oxidation treatment of this embodiment is performed in the same manner as in embodiment 1.

Embodiment 3
(i) Raw Material Powder

In this embodiment, description is made of a case using a nickel hydroxide solid solution powder having $\beta$-cobalt hydroxide carried thereon as a raw material powder. This raw material powder, in which the cobalt hydroxide portion is limited to $\beta$-cobalt hydroxide, is commercially available. This powder can also be obtained by the precipitation process by neutralization. In this process, the pH value of an aqueous alkaline solution in which the nickel hydroxide solid solution powder is dispersed is 10 to 13.

(ii) First Oxidation Treatment

In the first oxidation treatment, the aforementioned raw material powder is oxidized by heating to 80 to 160° C. using heated air. This step causes $\beta$-cobalt hydroxide to be oxidized into a cobalt oxyhydroxide of a low oxidation degree. The oxidation number of cobalt can be controlled as desired by selecting the heating temperature or heating time, whereas the nickel hydroxide solid solution portion is not oxidized. If the heating temperature is lower than 80° C., it takes a longer time for the oxidation reaction to complete.

On the other hand, if the heating temperature is higher than 160° C., cobalt hydroxide is decomposed to produce $Co_3O_4$. In case of heating the raw material powder at, for example, 115 to 125° C., the heating time is suitably 1 to 3 hours. If the heating time is too short, oxidation of cobalt hydroxide does not proceed sufficiently.

$\beta$-cobalt hydroxide readily dissolves in an aqueous alkaline solution having a high concentration, but a cobalt oxyhydroxide of a low oxidation degree hardly dissolves in such a high-concentration aqueous alkaline solution. Further, $\beta$-cobalt hydroxide is likely to be oxidized rapidly and therefore changes in volume. On the other hand, a cobalt oxyhydroxide of a low oxidation degree is free from such an inconvenience. Thus, by performing the first oxidation treatment previously, the second oxidation treatment can use a high-concentration and high-temperature aqueous alkaline solution to allow a rapid oxidation reaction, with the adhered state of the cobalt compounds hardly changed.

(iii) Second Oxidation Treatment

In the second oxidation treatment, the powder obtained by the first oxidation treatment is dispersed in an aqueous alkaline solution having a normality of 1N or more and a temperature of 30 to 80° C. and oxidized by mixing an oxidizing agent with the resultant dispersion to give a nickel oxyhydroxide solid solution powder having a cobalt oxyhydroxide of a high oxidation degree carried thereon.

As the aqueous alkaline solution and oxidizing agent in this embodiment, the same ones as specifically mentioned in the second oxidation treatment of embodiment 1 may be used.

The quantity of the oxidizing agent may be selected as desired in the same manner as in the second oxidation treatment of embodiment 1. When, for example, a nickel hydroxide solid solution powder having cobalt hydroxide in an amount equivalent to 10% by weight of the nickel hydroxide carried thereon is used as the raw material powder, it is preferable to use, for example, 65 to 400 ml of an aqueous solution of NaClO having an effective chlorine quantity of 12% by weight so as to adjust the oxidation number of cobalt to a value more than 3 and the oxidation number of nickel to 2.1 or more.

Embodiment 4
(i) Raw Material Powder

In this embodiment, the same raw material powder as used in embodiment 3 is used. This embodiment is the same as embodiment 3 except the first oxidation treatment of the raw material powder.

(ii) First Oxidation Treatment

In the first oxidation treatment, initially the raw material powder is dispersed in water or an aqueous alkaline solution. Examples of such aqueous alkaline solutions for use include the aqueous solutions of sodium hydroxide, potassium hydroxide and/or lithium hydroxide. The pH of the aqueous alkaline solution preferably ranges between 10 and 13. If the pH of the solution exceeds 13, $\beta$-cobalt hydroxide is undesirably dissolved in the aqueous alkaline solution.

Subsequently, the dispersion containing the powder is mixed with an oxidizing agent to oxidize the $\beta$-cobalt hydroxide portion of the raw material powder into a cobalt oxyhydroxide of a low oxidation degree. As the oxidizing agent may be used any one of the specific oxidizing agents that can be used in the second oxidation treatment of embodiment 1.

In the case where, for example, an aqueous solution of NaClO having an effective chlorine quantity of 12% by weight is used, the quantity of the oxidizing agent to be used is suitably 1 to 30 ml per 100 g of the raw material powder.

(iii) Second Oxidation Treatment

The second oxidation treatment is performed in the same manner as in embodiment 3.

Embodiment 5

(i) Raw Material

In this embodiment, description is made of a case using a nickel hydroxide solid solution powder having α-cobalt hydroxide carried thereon as a raw material powder. In this raw material powder, the cobalt hydroxide portion is limited to α-cobalt hydroxide. This powder can also be obtained using the precipitation process by neutralization. Here, the pH value of an aqueous alkaline solution in which the nickel hydroxide solid solution powder is dispersed is 8 to 10.

α-cobalt hydroxide contains therein water, alkali metal ions and/or the like and hence exhibits very low crystallinity. Accordingly, when the raw material powder is dispersed in a low-temperature aqueous alkaline solution having a low alkali concentration and mixed with an oxidizing agent, α-cobalt hydroxide is readily oxidized. As a result, there is produced a highly electrically conductive cobalt oxyhydroxide of a high oxidation degree and low crystallinity.

(ii) Oxidation Treatment

The pH value of an aqueous alkaline solution, in which the raw material powder is dispersed, is suitably 10 or lower, and the reaction temperature is suitably 25 to 80° C. This embodiment consists of a single oxidation treatment because a highly electrically conductive cobalt compound of a high oxidation degree that has a disordered crystal structure can be produced by a single oxidation treatment without requiring the use of a high-concentration aqueous alkaline solution. Thus, this embodiment is the best in terms of production cost.

Examples of such aqueous alkaline solutions for use include the aqueous solutions of sodium hydroxide, potassium hydroxide and/or lithium hydroxide. As the oxidizing agent may be used any one of the specific oxidizing agents that can be used in the second oxidation treatment of embodiment 1.

In the case where, for example, an aqueous solution of NaClO having an effective chlorine quantity of 12% by weight is used, the quantity of the oxidizing agent to be used is suitably 300 to 400 ml per 100 g of the raw material powder.

Hereinafter, the present invention will be specifically described by way of examples. These examples, however, are not limitative of the present invention in any sense.

EXAMPLE 1

(1) Active Materials

Active Material (a)

(i) First Oxidation Treatment

A raw material powder was prepared comprising 100 parts by weight of a nickel hydroxide solid solution powder having a mean particle size of 10 $\mu$m and containing 3% by weight of magnesium, and 5 parts by weight of cobalt hydroxide carried thereon. 8 ml of an aqueous sodium hydroxide solution having a normality of 18N was added to 100 g of the raw material powder, and the resultant mixture was heated by an irradiation of microwave while heated air of 100° C. was delivered to the mixture. During this operation the powder was stirred continuously. With the temperature of the powder being maintained at 100° C., the powder was dried under humidity control. The dried powder thus obtained was washed with water and then dried to give a nickel hydroxide solid solution powder having a cobalt oxyhydroxide carried thereon. The powder in the compressed form thus obtained exhibited a electrical conductivity of approximately 0.1 S/cm. The oxidation number of cobalt determined by iodometric titration was 3.19.

(ii) Second Oxidation Treatment

Into water heated to 50° C. being stirred, the powder obtained in the first oxidation treatment was put and further an aqueous solution of NaClO having an effective chlorine quantity of approximately 12% by weight was poured at a rate of approximately 50 ml per 100 g of the powder, to give a dispersion of the powder. Thereafter, the dispersion was continuously stirred for one hour to complete the oxidation reaction. Subsequently, the powder was separated from the dispersion, washed with water and then dried to give a nickel oxyhydroxide solid solution powder, of which an oxidation number of nickel was 2.15, having a cobalt oxyhydroxide carried thereon, of which an oxidation number of cobalt was 3.19. The obtained powder was active material (a).

Active Material (b)

100 parts by weight of a nickel hydroxide solid solution powder having a mean particle size of 10 $\mu$m and containing 3% by weight of magnesium was mixed with 5 parts by weight of a cobalt hydroxide powder having a mean particle size of 1 $\mu$m, and 8 ml of an aqueous sodium hydroxide solution having a normality of 18N was added to 100 g of the resultant mixture. Thereafter, the same procedure as in the preparation of active material (a) was performed to give a nickel oxyhydroxide solid solution powder, of which an oxidation number of nickel was 2.15, having a cobalt oxyhydroxide carried thereon, of which an oxidation number of cobalt was 3.19. The obtained powder was active material (b).

Active Material (c)

The powdery raw material of the active material (a), namely the powder comprising 100 parts by weight of the nickel hydroxide solid solution powder, and 5 parts by weight of cobalt hydroxide carried thereon was used as active material (c).

Active Material (d) 100 g of the active material (c) was soaked in a mixture of 1000 ml of an aqueous solution containing 30 wt % sodium hydroxide and 50 ml of an aqueous solution containing 12 wt % NaClO, followed by continuous stirring for 10 minutes. Subsequently, the powder was separated from the resultant dispersion, washed with water and then dried to give a nickel hydroxide solid solution powder having a cobalt oxyhydroxide carried thereon. The obtained powder was active material (d).

Active Material (d')

The same operation as in the preparation of the active material (d) except that the quantity of the aqueous solution containing 12 wt % NaClO was varied from 50 ml to 1000 ml was performed to give a nickel oxyhydroxide solid solution powder having a cobalt oxyhydroxide carried thereon. The obtained powder was active material (d').

(2) Positive Electrodes

Positive Electrode (a)

To 100 parts by weight of the active material (a) was added 0.5 parts by weight of yttrium oxide, 0.1 parts by weight of carboxymethylcellulose (CMC) as a thickening agent, 0.2 parts by weight of polytetrafluoroethylene (PTFE) as a binder, and a predetermined quantity of pure water, to give a paste. The paste thus obtained was filled into a foamed metal sheet having a three-dimensional finely porous structure, followed by drying and pressing to give positive electrode (a).

Positive Electrode (b)

The same operation as in the preparation of the positive electrode (a) except the use of the active material (b) instead of the active material (a) was performed to give positive electrode (b).

Positive Electrode (c)

The same operation as in the preparation of the positive electrode (a) except the use of the active material (c) instead of the active material (a) was performed to give positive electrode (c).

Positive Electrode (d)

The same operation as in the preparation of the positive electrode (a) except the use of a mixture comprising 75 parts by weight of the active material (d) and 25 parts by weight of the active material (d') instead of the active material (a) was performed to give positive electrode (d).

(3) Batteries

Battery (a-1)

The positive electrode (a) and a negative electrode were laid one on top of the other via a separator and wound to form electrode group (a). The negative electrode was obtained by applying a predetermined paste comprising a hydrogen storage alloy, carbon black, a thickening agent, and a binding agent onto a metal foil, drying the paste, and pressing the metal foil with the paste. The separator comprised a polypropylene non-woven fabric imparted with hydrophilicity. The electrode group (a) was assembled with positive and negative collectors on the upper and lower faces thereof and then inserted into a metal case. The negative electrode collector was electrically connected with a bottom plate of the metal case, and the positive electrode collector was electrically connected with a predetermined place of a sealing plate with a safety valve. An electrolyte was injected into the metal case and the opening of the metal case was sealed, to give battery (a-1) as an example of the present invention. This battery was a nickel-metal hydride storage battery of 4/5SC size, and the space within the battery was approximately 1.2 ml. The electrolyte used was an aqueous alkaline solution prepared by adding lithium hydroxide monohydrate at a rate of 40 g/liter to 7 mol/liter of an aqueous KOH solution.

In the battery (a-1), the negative electrode has a theoretical capacity $C^0_n$ of 1.4 times as much as the theoretical capacity of the positive electrode $C^0_p$. The theoretical capacity of the positive electrode ($C^0_p$) was calculated by multiplying the weight (g) of nickel hydroxide included in the positive electrode by the electric capacity of the nickel hydroxide per unit weight. On the assumption that nickel hydroxide was subjected to the one-electron reaction, the electric capacity of nickel hydroxide is 289 mAh/g.

Battery (a-2)

The same operation as in the manufacture of the battery (a-1) except the use of a negative electrode having a theoretical capacity of 1.65 times as much as the theoretical capacity of the positive electrode (a) was performed to give battery (a-2).

Battery (b-1)

The same operation as in the manufacture of the battery (a-1) except the use of the positive electrode (b) and a negative electrode having a theoretical capacity of 1.4 times as much as the theoretical capacity of the positive electrode (b) was performed to give battery (b-1).

Battery (b-2)

The same operation as in the manufacture of the battery (b-1) except the use of a negative electrode having a theoretical capacity of 1.65 times as much as the theoretical capacity of the positive electrode (b) was performed to give battery (b-2).

Battery (c-1)

The same operation as in the manufacture of the battery (a-1) except the use of the positive electrode (c) and a negative electrode having a theoretical capacity of 1.4 times as much as the theoretical capacity of the positive electrode (c) was performed to give battery (b-1) as a comparative example.

Battery (c-2)

The same operation as in the manufacture of the battery (c-1) except the use of a negative electrode having a theoretical capacity of 1.65 times as much as the theoretical capacity of the positive electrode (c) was performed to give battery (c-2).

Battery (d-1)

The same operation as in the manufacture of the battery (a-1) except the use of the positive electrode (d) and a negative electrode having a theoretical capacity of 1.4 times as much as the theoretical capacity of the positive electrode (d) was performed to give battery (d-1).

Battery (d-2)

The same operation as in the manufacture of the battery (d-1) except the use of a negative electrode having a theoretical capacity of 1.65 times as much as the theoretical capacity of the positive electrode (d) was performed to give battery (d-2).

(4) Evaluation of Batteries (i) Pre-treatment of Batteries

The batteries thus manufactured were left 24 hours after the manufacture. Each of the batteries was charged with the electric current of 0.2 A at 20° C. for 15 hours and then left at 20° C. for 1 hour. Each battery was subsequently discharged to a voltage level of 1 V at the electric current of 0.4 A at 20° C. This cycle was repeated twice, and the battery was subjected to an aging process at 45° C. for one week. This gave batteries for evaluation.

(ii) Battery Capacities

Each of the batteries for evaluation was charged with the electric current of 0.2 A at 20° C. for 15 hours and then left at 20° C. for 1 hour. Each battery was subsequently discharged to a voltage level of 1 V at the electric current of 0.4 A at 20° C. The battery was again charged in the previous manner and discharged at the electric current of 10 A. The battery capacities at the discharge electric current of 0.4 A and 10 A were calculated from the respective discharge times. A percent rate (%) was found by dividing the battery capacity $C_{10A}$ at the discharge electric current of 10 A by the battery capacity $C_{0.4A}$ at the discharge electric current of 0.4 A. The results thus obtained are shown in Table 1.

(iii) Internal Pressure of Batteries

A hole was formed on the bottom of each of the batteries for evaluation under the completely discharged condition. After a pressure sensor was inserted into the hole, the hole was sealed. Each battery was charged with an electric quantity of 1.2 times as much as the electric capacity of the positive electrode at the electric current of 2.0 A at 20° C. for 1.2 hours. The maximum pressure $P_{max}$ (kg/cm$^2$) in this charging process was measured. The results thus obtained are shown in Table 1.

(iv) Measurement of Discharge Reservoir

The upper portion and the bottom portion of the metal case of each of the batteries in the completely charged condition were opened, and the battery was soaked in the electrolyte in a beaker. A mercury electrode (Hg/HgO) was inserted as a reference electrode in the beaker, so as to enable measurement of the potentials of the positive electrode and the negative electrode relative to the reference electrode. The battery was continuously discharged at the electric current of 0.4 A until hydrogen was produced from the positive electrode and oxygen produced from the negative electrode.

The discharge reservoir $R_{dis}$ (mAh) was calculated by subtracting the electric quantity, that was, the capacity of the positive electrode $C_p$, to vary the potential of the positive electrode from approximately 0.5 V to −0.1 V relative to Hg/HgO from the electric quantity, that was, the capacity of the negative electrode $C_n$, to vary the potential of the negative electrode from approximately −0.9 V to −0.6 V relative to Hg/HgO. The discharge reservoir $R_{dis}$ (mAh) thus obtained was divided by the capacity $C_p$ (mAh) of the positive electrode to be expressed as a percent rate (%) relative to the capacity of the positive electrode. The results thus obtained are shown in Table 1.

(v) Capacity Maintenance Rate

Under the charging control (ΔT/Δt) of detecting a temperature rise per unit time, each of the batteries was subjected to repeated cycles at 20° C., where each cycle charged the battery at the electric current of 4.0 A, left the battery one hour, and discharged the battery to a voltage level of 0.6 V at the electric current of 10A. The percent rate (%) relative to the initial capacity was obtained by dividing the discharge capacity $C_{500}$ at the $500^{th}$ cycle by the initial discharge capacity $C_{ini}$. The results thus obtained are shown in Table 1.

TABLE 1

| Battery | $C_n \div C_p$ | $C_{0.4A}$ (mAh) | $C_{10A} \div C_{0.4A} \times 100$ (%) | $P_{max}$ (Kg/cm$^2$) | $R_{dis} \div C_p \times 100$ (%) | $C_{500} \div C_{ini} \times 100$ (%) |
|---|---|---|---|---|---|---|
| a-1 | 1.40 | 2300 | 97.3 | 6.0 | 5 | 95 |
| a-2 | 1.65 | 2000 | 97.4 | 2.5 | 5 | 99 |
| b-1 | 1.40 | 2280 | 97.0 | 6.2 | 5 | 94 |
| b-2 | 1.65 | 1980 | 96.7 | 2.6 | 5 | 98 |
| c-1 | 1.40 | 2300 | 97.5 | 19.0 | 25 | 62 |
| c-2 | 1.65 | 2000 | 97.3 | 6.5 | 25 | 95 |
| d-1 | 1.40 | 2185 | 97.4 | 3.5 | −5 | 79 |
| d-2 | 1.65 | 1900 | 98.1 | 1.8 | −5 | 88 |

As clearly understood from Table 1, the battery (a-1) is a high-capacity battery exhibiting high discharge properties and a high capacity maintenance rate, though the capacity of its negative electrode is reduced as compared with that of the battery (c-2). This indicates that the present invention makes it possible to provide a battery having the discharge properties which are not deteriorated due to a reduction in the discharge reservoir and holding an adequate quantity of charge reservoir.

The batteries (d-1) and (d-2) have lower battery capacities as well as lower capacity maintenance rates due to their respective inadequate quantities of discharge reservoir.

As can be understood from Table 1, the present invention can really make the discharge reservoir of the negative electrode adequate. It can further be understood that the present invention can realize a battery of a higher capacity without deteriorating the conventional level of the discharge properties.

EXAMPLE 2

Elements that can be contained in the nickel hydroxide solid solution powder were studied. Specifically, the nickel hydroxide solid solution containing Co, Zn, Cd, Ca, Sr, Mn, Al, "Co and Zn", or "Co and Mg" was used instead of the nickel hydroxide solid solution containing Mg. Taking Al for instance, a raw material powder, which comprises 100 parts by weight of the nickel hydroxide solid solution powder having a mean particle size of 10 μm and containing 3% by weight of aluminum, having 5 parts by weight of cobalt hydroxide carried thereon, was used to give a nickel oxyhydroxide solid solution having a cobalt oxyhydroxide carried thereon. Except this point, the same procedure as in the manufacture of the battery (a-1) was performed to manufacture batteries, which in turn were measured for discharge capacity $C_{0.4}$ and capacity maintenance rate (($C_{500} \div C_{ini}$)× 100) in the same manner as with the battery (a-1). The results thus obtained are shown in Table 2.

For comparison, table 2 also shows the results of measurement conducted on a battery manufactured in the same manner as with the battery (a-1) except the use of a nickel hydroxide powder instead of the solid solutions.

TABLE 2

| Dissolved element | Content of dissolved element (wt %) | $C_{0.4}$ (mAh) | $C_{500} \div C_{ini} \times 100$ % |
|---|---|---|---|
| None | 0 | 2300 | 57 |
| Mg | 3 | 2300 | 95 |
| Co | 3 | 2325 | 93 |
| Zn | 3 | 2300 | 94 |
| Cd | 3 | 2300 | 95 |
| Ca | 3 | 2300 | 94 |
| Sr | 3 | 2300 | 94 |
| Mn | 3 | 2350 | 92 |
| Al | 3 | 2300 | 92 |
| Co + Zn | 1 (Co) + 2 (Zn) | 2325 | 97 |
| Co + Mg | 1 (Co) + 2 (Mg) | 2325 | 98 |

As seen from table 2, a high-capacity and long-life battery can be obtained by the use of any one of the above solid solutions.

EXAMPLE 3

The weight ratio of cobalt hydroxide to the nickel hydroxide solid solution powder was studied. Various active materials were prepared in the same manner as in the preparation of the active material (b) except that the mixing ratio of the cobalt hydroxide powder to the nickel hydroxide solid solution powder was varied, and by the use of these active materials, batteries similar to the battery (b-1) were manufactured. These batteries were measured for their respective battery capacities $C_{0.4}$ at the discharge electric current of 0.4 A in the same manner as with the battery (b-1).

FIG. 1 shows the relation between the weight ratio of cobalt hydroxide to the nickel hydroxide solid solution and the battery capacity.

As seen from FIG. 1, a high battery capacity can be obtained when the weight ratio of cobalt hydroxide to the nickel hydroxide solid solution is within the range between 0.005 to 0.2.

EXAMPLE 4

Various active materials were prepared in the same manner as in the preparation of the active material (a) except that the concentration of the aqueous alkaline solution used in the first oxidation treatment was varied, and by the use of these active materials, batteries similar to the battery (a-2) were manufactured. These batteries were measured for their respective battery capacities $C_{0.4}$ at the discharge electric current of 0.4 A in the same manner as with the battery (a-2). The measurement was performed with respect to the cases using aqueous NaOH and aqueous KOH solutions, respectively, as the aqueous alkaline solution. The relation between the concentration of the aqueous alkaline solution and the battery capacity is shown in FIG. 2.

FIG. 2 indicates that the aqueous alkaline solution used in the first oxidation treatment preferably has a normality of 1N or more for a high-capacity battery to be obtained.

EXAMPLE 5

Various active materials were prepared in the same manner as in the preparation of the active material (a) except that the heating and drying temperature in the first oxidation treatment was varied, and by the use of these active materials, batteries similar to the battery (a-2) were manufactured. These batteries were measured for their respective battery capacities $C_{0.4}$ at the discharge electric current of 0.4 A in the same manner as with the battery (a-2).

Figure 3:
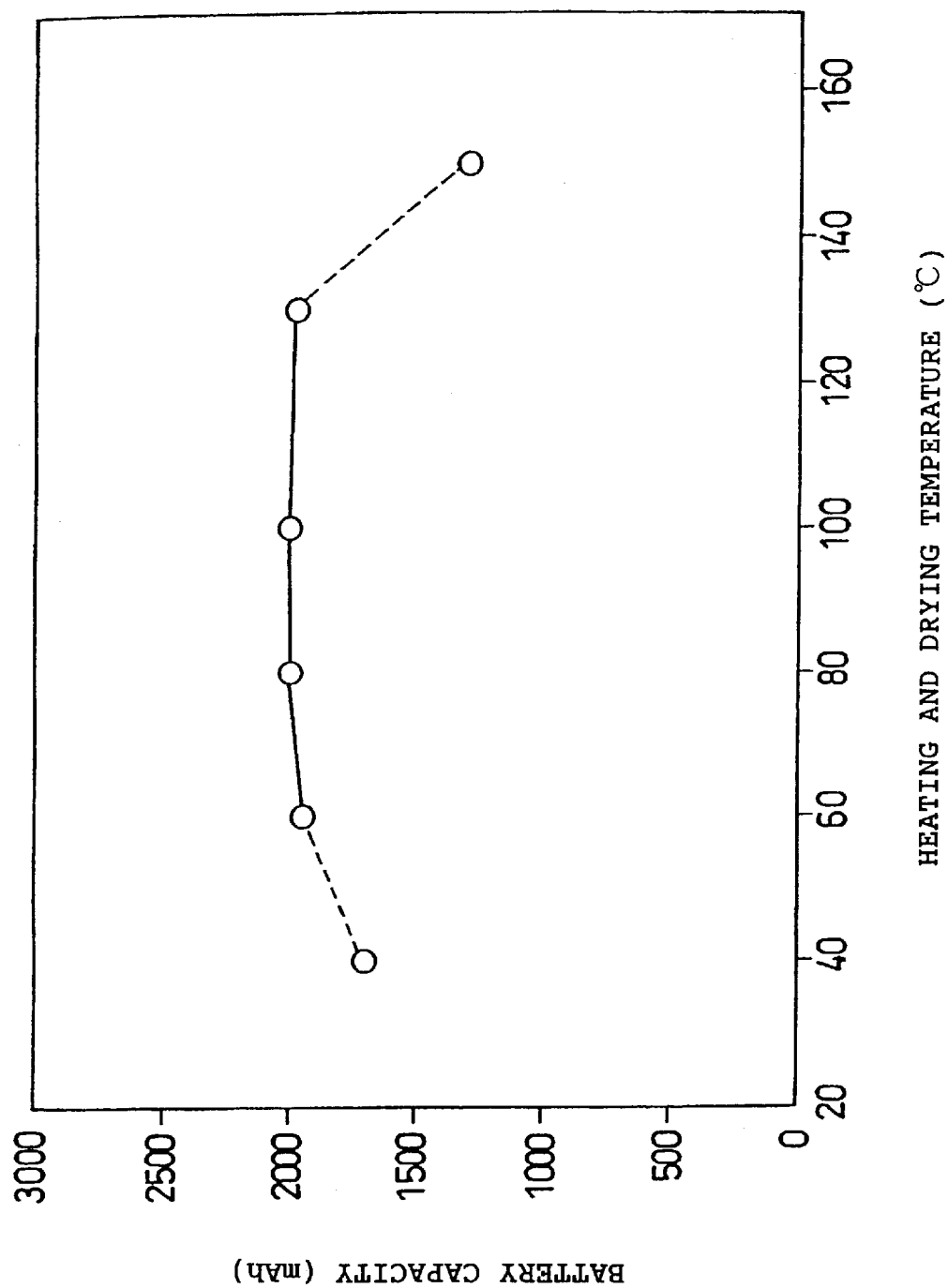
FIG. 3 is a graph showing the relation between the temperature at which the raw material powder is heated and dried in an atmosphere having oxygen in the first oxidation treatment of embodiment 1 of the present invention and the capacity of a battery using a resultant active material.

The relation between the heating and drying temperature and the battery capacity is shown in FIG. 3. FIG. 3 indicates that a favorable range of the heating and drying temperature is 60 to 130° C.

EXAMPLE 6

Various active materials were prepared in the same manner as in the preparation of the active material (a) except that the dispersion medium used in the second oxidation treatment was changed from water to other medium, and by the use of these active materials, batteries similar to the battery (a-2) were manufactured. These batteries were measured for their respective battery capacities $C_{0.4}$ and capacity maintenance rates $((C_{500} \div C_{ini}) \times 100)$ at the discharge electric current of 0.4 A in the same manner as with the battery (a-2).

The measurement was performed with respect to the cases using pure water, an aqueous KOH solution of 2N, an aqueous NaOH solution of 2N, an aqueous LiOH solution of 2N, and an aqueous solution containing NaOH in an amount equivalent to 1N and LiOH in an amount equivalent to 1N, respectively, as the dispersion media. The results obtained are shown in Table 3.

TABLE 3

| Dispersion media | $C_{0.4}$ (mAh) | $C_{500} \div C_{ini} \times 100$ (%) |
| --- | --- | --- |
| Water | 2000 | 99 |
| 2N-aqueous KOH solution | 2000 | 99 |
| 2N-aqueous NaOH solution | 2000 | 99 |
| 2N-aqueous LiOH solution | 2050 | 100 |
| Aqueous solution containing 1N-NaOH and 1N-LiOH | 2025 | 100 |

Table 3 indicates that the use of any one of the above dispersion media can produce a high-capacity and long-life battery.

EXAMPLE 7

(1) Active Materials
Active Material (e)
(i) First Oxidation Treatment

A raw material powder was prepared comprising 100 parts by weight of a nickel hydroxide solid solution powder having a mean particle size of 10 μm and containing 3% by weight of magnesium, and 5 parts by weight of β-cobalt hydroxide carried thereon. The raw material powder was heated with heated air at 120° C. for 3 hours. As a result, the color of cobalt hydroxide was changed from pink to brown. This phenomenon indicates that a cobalt oxyhydroxide of a low oxidation state was produced.

(ii) Second Oxidation Treatment 100 g of the powder obtained in the first oxidation treatment was put into an aqueous sodium hydroxide solution of 10N, and the resultant dispersion was heated to 50° C. In turn, 400 ml of an aqueous solution of NaClO having an effective chlorine quantity of 12% by weight was added dropwise to the dispersion. Thereafter, the dispersion was continuously stirred for one hour to complete the oxidation reaction. Subsequently, the powder was separated from the dispersion, washed with water and then dried to give a nickel oxyhydroxide solid solution powder, of which an oxidation number of nickel was 2.98, having a cobalt oxyhydroxide carried thereon, of which an oxidation number of cobalt was 3.12. The obtained powder was active material (e).

During the reaction, the supernatant of the aqueous alkaline solution used as the dispersion medium was colorless, and even after the reaction was finished, there was not observed any contamination of the inner wall of the reaction bath or any floating particulate matter in the aqueous alkaline solution. This indicates that cobalt hardly dissolved into the aqueous alkaline solution.

Active Material (f)
(i) First Oxidation Treatment

A nickel hydroxide solid solution powder having a mean particle size of 10 μm and containing 3% by weight of magnesium was prepared. This powder was put into an aqueous solution of sodium hydroxide having a pH value of 12, and an aqueous cobalt sulfate solution, an aqueous ammonium sulfate solution as a source of coordination group and an aqueous hydrazine solution as a reducing agent or antioxidant were added dropwise to the resultant dispersion being stirred to cause β-cobalt hydroxide to deposit on the surface of the particle of the nickel hydroxide solid solution powder. During this operation an additional aqueous solution of sodium hydroxide was added dropwise to the dispersion to maintain the pH value thereof at 12. The quantity of β-cobalt hydroxide deposited on the surface of the particle of the nickel hydroxide solid solution powder was 5 parts by weight per 100 parts by weight of the nickel hydroxide solid solution. Subsequently, an aqueous solution of NaClO having an effective chlorine quantity of 12% by weight was added to the dispersion until the color of cobalt hydroxide was changed to brown.

(ii) Second Oxidation Treatment

After the first oxidation treatment, solid sodium hydroxide was put into the dispersion until the normality of the aqueous solution of sodium hydroxide as the dispersion medium of the dispersion became 10N. Then, the temperature of the dispersion was adjusted to 50° C., and 400 ml of an aqueous solution of NaClO having an effective chlorine quantity of 12% by weight was added dropwise to the dispersion per 100 g of the powder. Thereafter, the dispersion was continuously stirred for one hour to complete the oxidation reaction. Subsequently, the powder was separated from the dispersion, washed with water and then dried to give a nickel oxyhydroxide solid solution powder, of which an oxidation number of nickel was 2.99, having a cobalt oxyhydroxide carried thereon, of which an oxidation number of cobalt was 3.13. The obtained powder was active material (f).

During the reaction, the supernatant of the aqueous alkaline solution used as the dispersion medium was colorless, and even after the reaction was finished, there was not observed any contamination of the inner wall of the reaction bath or any floating particulate matter in the aqueous alkaline solution.

Active Material (g)

A nickel hydroxide solid solution powder (mean particle size: 10 μm) containing 3% by weight of magnesium was prepared. This powder was put into an aqueous solution of sodium hydroxide having a pH value of 8.5, and an aqueous cobalt sulfate solution, an aqueous ammonium sulfate solution and an aqueous hydrazine solution were added dropwise to the resultant dispersion while being stirred to cause α-cobalt hydroxide, which was a production in a low pH region, to deposit on the surface of the particle of the nickel hydroxide solid solution powder. During this operation an additional aqueous sodium hydroxide solution was added dropwise to the dispersion to maintain the pH value thereof at 8.5. The quantity of α-cobalt hydroxide deposited on the surface of the particle of the nickel hydroxide solid solution powder was 5 parts by weight per 100 parts by weight of the nickel hydroxide solid solution.

Subsequently, 300 ml of an aqueous solution of NaClO having an effective chlorine quantity of 12% by weight was added to the dispersion. Thereafter, the dispersion was continuously stirred for one hour to complete the oxidation reaction. Subsequently, the powder was separated from the dispersion, washed with water and then dried to give a nickel oxyhydroxide solid solution powder, of which an oxidation number of nickel was 2.97, having a cobalt oxyhydroxide carried thereon, of which an oxidation number of cobalt was 3.11. The obtained powder was active material (g).

Any one of the active materials (e) to (g) obtained in this example exhibited the conductivity in the compressed form of approximately 0.1 S/cm. Chemical analysis and X-ray diffraction analysis, which were conducted on the insoluble matter obtained after having heated each active material with aqueous acetic acid solution, confirmed the presence of a cobalt oxyhydroxide of low crystallinity having an oxidation number of cobalt of more than 3 in each active material.

Active Material (h)

A raw material powder was prepared comprising 100 parts by weight of a nickel hydroxide solid solution powder having a mean particle size of 10 μm and containing 3% by weight of magnesium, and 5 parts by weight of cobalt hydroxide carried thereon. To 100 g of this powder was added 8 ml of an aqueous sodium hydroxide solution of 18N while stirring, and the resultant mixture was irradiated with microwave, while heated air at 100° C. was delivered to the mixture. The temperature of the powder being maintained at 100° C., the powder was dried under humidity control. The resultant dried powder was washed with water and then dried to give a nickel hydroxide solid solution powder having a cobalt oxyhydroxide carried thereon. The obtained powder was active material (h). The powder (h) thus obtained exhibited the conductivity in the compressed form of approximately 0.1 S/cm. The oxidation number of cobalt determined by iodometric titration was 3.19.

(2) Positive Electrodes
Positive Electrode (e)

To 100 parts by weight of a mixture comprising 85 parts by weight of the active material (h) and 15 parts by weight of the active material (e) was added 0.5 parts by weight of ytterbium oxide, 0.1 parts by weight of carboxymethylcellulose as a thickening agent, 0.2 parts by weight of polytetrafluoroethylene as a binding agent, and pure water, to give a paste. The paste thus obtained was filled into a foamed metal sheet having a three-dimensional finely porous structure, followed by drying and pressing to give positive electrode (e).

Positive Electrode (f)

The same operation as in the preparation of the positive electrode (e) except the use of the active material (f) instead of the active material (e) was performed to give positive electrode (f).

Positive Electrode (g)

The same operation as in the preparation of the positive electrode (e) except the use of the active material (g) instead of the active material (e) was performed to give positive electrode (g).

(3) Batteries
Battery (e)

Battery (e) was manufactured in the same manner as in the manufacture of the battery (a-1) except the use of the positive electrode (e) instead of the positive electrode (a) and the use of an aqueous alkaline solution containing potassium hydroxide, sodium hydroxide and lithium hydroxide at concentrations of 4 mol/liter, 3 mol/liter and 1 mol/liter, respectively, as the electrolyte. In the battery (e), the negative electrode has a theoretical capacity $C^0_n$ of 1.4 times as much as the theoretical capacity $C^0_p$ of the positive electrode.

Battery (f)

The same operation as in the manufacture of the battery (e) except the use of the positive electrode (f) instead of the positive electrode (e) was performed to give battery (f).

Battery (g)

The same operation as in the manufacture of the battery (e) except the use of the positive electrode (g) instead of the positive electrode (e) was performed to give battery (g).

The batteries thus obtained were evaluated in the same manner as in example 1. The results of the evaluation are shown in Table 4.

TABLE 4

| Battery | $C_n \div C_p$ | $C_{0.4A}$ (mAh) | $C_{10A} \div C_{0.4A} \times 100$ (%) | $P_{max}$ (Kg/cm$^2$) | $R_{dis} \div C_p \times 100$ (%) | $C_{500} \div C_{ini} \times 100$ (%) |
|---|---|---|---|---|---|---|
| E | 1.40 | 2300 | 97.3 | 6.0 | 5 | 99 |
| F | 1.40 | 2300 | 97.4 | 6.0 | 5 | 99 |
| G | 1.40 | 2295 | 97.1 | 6.2 | 5 | 98 |

In Table 4, the batteries (e) to (g) are excellent in capacity maintenance rate. This is because the batteries (e) to (g) have adequate quantities of discharge reservoir and charge reservoir.

As can be understood from Table 4, the present invention can really make the discharge reservoir of the negative electrode adequate. It can further be understood that the present invention can realize a battery of a higher capacity without deteriorating the conventional level of the discharge properties.

EXAMPLE 8

Various active materials were prepared in the same manner as in the preparation of the active material (e) except that the temperature of heated air was varied, and batteries similar to the battery (e) were manufactured by the use of these active materials, and then evaluated in the same manner as with the battery (e). Table 5 shows the relation among the temperature (T) of heated air used in the preparation of each active material, the color of the aqueous alkaline solution when the powder obtained in the first oxidation treatment was put thereinto in the second oxidation treatment, the presence or absence of any floating cobalt compound in the aqueous alkaline solution used in the second oxidation treatment, and the battery capacity.

TABLE 5

| T (° C.) | Color of solution | Floating particulate Co compound | $C_{0.4A}$ (mAh) |
|---|---|---|---|
| 60 | Deep blue | Present | 2300 |
| 80 | Colorless | Absent | 2300 |
| 100 | Colorless | Absent | 2300 |

TABLE 5-continued

| T (° C.) | Color of solution | Floating particulate Co compound | $C_{0.4A}$ (mAh) |
|---|---|---|---|
| 120 | Colorless | Absent | 2305 |
| 130 | Colorless | Absent | 2300 |
| 140 | Colorless | Absent | 2300 |
| 160 | Colorless | Absent | 2295 |
| 170 | Colorless | Absent | 1940 |

As seen from Table 5, in the case where the powder oxidized with heated air at 60° C. was put into the high-temperature and high-concentration aqueous alkaline solution, the color of the aqueous alkaline solution changed to deep blue, which indicates that cobalt was dissolved into the aqueous alkaline solution. In the case of heated air at 170° C., on the other hand, the battery capacity lowered. Presumably, this is because the cobalt compound resulting from the oxidation by heated air was not modified into a compound having a higher electrical conductivity by the subsequent treatment. It can be concluded from the foregoing that a favorable temperature range of heated air is 80 to 160° C.

EXAMPLE 9

Various active materials were prepared in the same manner as in the preparation of the active material (e) except that the concentration of the aqueous alkaline solution was varied, and by the use of these active materials, batteries similar to the battery (e) were manufactured and evaluated in the same manner as with the battery (e). Further, an active material was prepared in the same manner as in the preparation of the active material (e) except the use of an aqueous alkaline solution containing sodium hydroxide in an amount equivalent to 5N and lithium hydroxide in an amount equivalent to 1N, and a battery similar to the battery (e) was manufactured by the use of this active material, and then evaluated in the same manner as with the battery (e). The relation between the concentration of the aqueous alkaline solution and the battery capacity is shown in FIG. 4.

Figure 4:
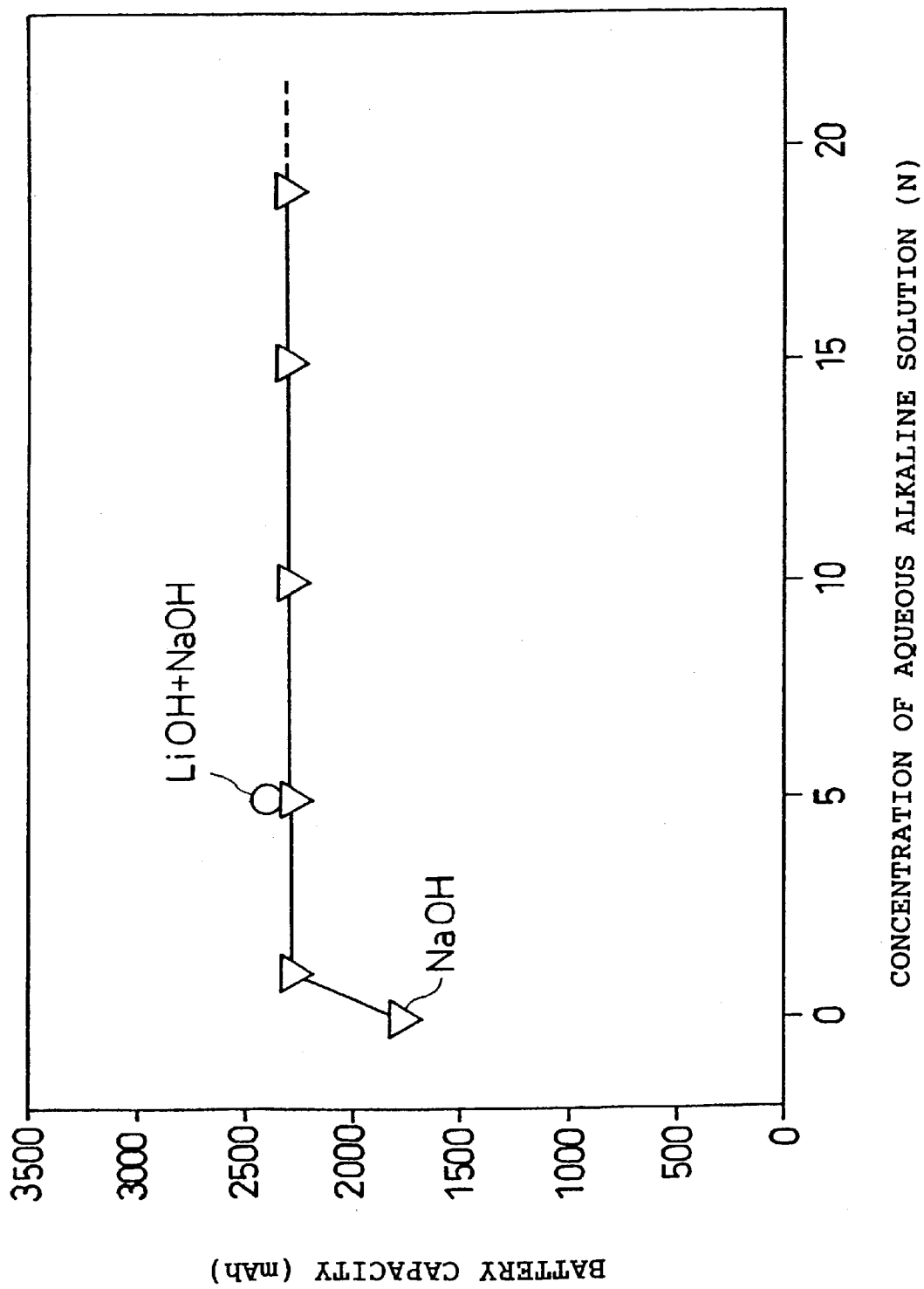
FIG. 4 is a graph showing the relation between the concentration of an aqueous solution of sodium hydroxide used in the second oxidation treatment of embodiment 3 of the present invention and the capacity of a battery using a resultant active material.

FIG. 4 indicates that the aqueous alkaline solution preferably has a normality of 1N or more. Further, it can be understood from FIG. 4 that the use of the aqueous alkaline solution containing lithium hydroxide makes it possible to obtain a high-capacity battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a positive electrode active material for an alkaline storage battery, comprising:
   (a) a first oxidation treatment of a raw material powder, which comprises a nickel hydroxide solid solution and cobalt hydroxide, to oxidize said cobalt hydroxide to a cobalt oxyhydroxide; and
   (b) a second oxidation treatment in which the treated powder from step (a), comprising nickel hydroxide solid solution and cobalt oxyhydroxide, is treated to oxidize said nickel hydroxide solid solution to a nickel oxyhydroxide solid solution.

2. The method for producing a positive electrode active material in accordance with claim 1,
   wherein said raw material powder is a nickel hydroxide solid solution powder having cobalt hydroxide carried thereon, or a mixture comprising a nickel hydroxide solid solution powder and a cobalt hydroxide powder.

3. The method for producing a positive electrode active material for an alkaline storage battery in accordance with claim 1,
   wherein said first oxidation treatment is a process where said raw material powder with an aqueous alkaline solution is heated and dried in an atmosphere having oxygen while being stirred, and
   said second oxidation treatment is a process where said powder having passed through said first oxidation treatment is dispersed in water or an aqueous alkaline solution and mixed with an oxidizing agent.

4. The method for producing a positive electrode active material for an alkaline storage battery in accordance with claim 3,
   wherein, in said first oxidation treatment, said aqueous alkaline solution has a normality of 1N or more and contains at least one selected from the group consisting of sodium hydroxide and potassium hydroxide, and
   in said second oxidation treatment, said aqueous alkaline solution contains at least one selected from the group consisting of sodium hydroxide, potassium hydroxide, and lithium hydroxide.

5. The method for producing a positive electrode active material for an alkaline storage battery in accordance with claim 1,
   wherein, in said first oxidation treatment, said cobalt hydroxide is oxidized until an oxidation number of cobalt thereof becomes more than 3, and
   in said second oxidation treatment, said nickel hydroxide solid solution is oxidized until an oxidation number of nickel thereof becomes not less than 2.1 and less than 2.2.

6. The method for producing a positive electrode active material for an alkaline storage battery in accordance with claim 1,
   wherein said raw material powder is a nickel hydroxide solid solution powder having β-cobalt hydroxide carried thereon,
   said first oxidation treatment is a process where said raw material powder is heated to 80 to 160° C. with heated air, or a process where said raw material powder is dispersed in water or an aqueous alkaline solution and mixed with an oxidizing agent, to give a nickel hydroxide solid solution powder having a cobalt oxyhydroxide of a low oxidation state carried thereon, and
   said second oxidation treatment is a process where said powder having passed through said first oxidation treatment is dispersed in an aqueous alkaline solution of 30 to 80° C. having a normality of 1N or more and mixed with an oxidizing agent to give a nickel oxyhydroxide solid solution powder having a cobalt oxyhydroxide of a high oxidation state carried thereon.

7. The method for producing a positive electrode active material for an alkaline storage battery in accordance with claim 6,
   wherein an oxidation number of cobalt in said cobalt oxyhydroxide of a low oxidation state is more than 2 and not more than 3, and an oxidation number of cobalt in said cobalt oxyhydroxide of a high oxidation state is more than 3.

8. The method for producing a positive electrode active material for an alkaline storage battery in accordance with claim 6, wherein, in said second oxidation treatment, said aqueous alkaline solution contains at least one selected from the group consisting of sodium hydroxide, potassium hydroxide, and lithium hydroxide.

9. The method for producing a positive electrode active material for an alkaline storage battery in accordance with claim 1, wherein said hydroxide solid solution contains at least one element selected from the group consisting of Co, Zn, Cd, Ca, Sr, Mg, Mn, and Al.

10. A method for producing a positive electrode active material for an alkaline storage battery, comprising a process where a nickel hydroxide solid solution powder having a-cobalt hydroxide carried thereon is dispersed in an aqueous alkaline solution of 25 to 80° C. having a pH value of not more than 10 and mixed with an oxidizing agent to give a positive electrode active material comprising a nickel oxyhydroxide solid solution powder having a cobalt oxyhydroxide carried thereon.

11. The method for producing a positive electrode active material for an alkaline storage battery in accordance with claim 10, wherein said nickel hydroxide solid solution contains at least one element selected from the group consisting of Co, Zn, Cd, Ca, Sr, Mg, Mn, and Al.

* * * * *